(12) United States Patent
Jailani

(10) Patent No.: US 11,362,935 B2
(45) Date of Patent: Jun. 14, 2022

(54) AUTOMATIC MULTI-CHASSIS LINK AGGREGATION CONFIGURATION WITH LINK LAYER DISCOVERY

(71) Applicant: SUPER MICRO COMPUTER, INC., San Jose, CA (US)

(72) Inventor: Sahul Hameed Abdul Kader Jailani, San Jose, CA (US)

(73) Assignee: SUPER MICRO COMPUTER, INC., San Joss (CA)

( * ) Notice: Subject to any disclaimer, the term of this patent is extended or adjusted under 35 U.S.C. 154(b) by 689 days.

(21) Appl. No.: 15/877,026

(22) Filed: Jan. 22, 2018

(65) Prior Publication Data

US 2019/0230026 A1 Jul. 25, 2019

Related U.S. Application Data

(63) Continuation-in-part of application No. 15/875,044, filed on Jan. 19, 2018, now Pat. No. 11,245,644.

(51) Int. Cl.
| | |
|---|---|
| H04L 41/12 | (2022.01) |
| H04L 45/24 | (2022.01) |
| H04L 41/0213 | (2022.01) |
| H04L 41/08 | (2022.01) |
| H04L 41/046 | (2022.01) |

(52) U.S. Cl.
CPC ........ *H04L 45/245* (2013.01); *H04L 41/0213* (2013.01); *H04L 41/046* (2013.01); *H04L 41/0886* (2013.01); *H04L 41/0876* (2013.01); *H04L 41/12* (2013.01)

(58) Field of Classification Search
USPC ........................................ 370/420
See application file for complete search history.

(56) References Cited

U.S. PATENT DOCUMENTS

| | | | |
|---|---|---|---|
| 2012/0233492 A1* | 9/2012 | Finn | H04L 45/586 714/E11.029 |
| 2013/0070764 A1* | 3/2013 | Boutros | H04L 49/351 370/390 |
| 2014/0133486 A1* | 5/2014 | Sivasankar | H04L 47/41 370/392 |
| 2014/0369186 A1* | 12/2014 | Ernstrom | H04L 41/0668 370/228 |
| 2014/0372576 A1* | 12/2014 | Mohandas | H04L 49/354 709/220 |
| 2016/0014142 A1* | 1/2016 | Wang | H04L 12/6418 726/4 |
| 2016/0301608 A1* | 10/2016 | Natarajan | H04L 45/7453 |

* cited by examiner

*Primary Examiner* — Gregory B Sefcheck
*Assistant Examiner* — Majid Esmaeilian
(74) *Attorney, Agent, or Firm* — Beyer Law Group LLP

(57) ABSTRACT

A computer network includes a server computer having communication ports that are wired to switch ports of two separate network switches. The network switches receive link layer discovery protocol (LLDP) packets from other network devices, and automatically aggregate corresponding switch ports into a port channel aggregation based on the contents of the LLDP packets.

16 Claims, 11 Drawing Sheets

AUTOMATIC MULTI-CHASSIS LINK AGGREGATION CONFIGURATION WITH LINK LAYER DISCOVERY

CROSS-REFERENCE TO RELATED APPLICATION

This application is a continuation-in-part of U.S. application Ser. No. 15/875,044, filed on Jan. 19, 2018, which is incorporated herein by reference in its entirety.

BACKGROUND OF THE INVENTION

1. Field of the Invention

The present invention relates generally to computer systems, and more particularly but not exclusively to computer networks.

2. Description of the Background Art

A network device, such as a server computer or a network switch, has a communication port that may be linked to a communication port of another network device. For example, a server computer may have a communication port in the form of a network interface card (NIC) port. Network switches have communication ports in the form of switch ports. The NIC port of a server computer may be linked to a switch port of a network switch to allow transmission of network traffic between the server computer and the network switch over the link. The network switch may have another switch port that is connected to a switch port of another network switch or to a NIC port of another server computer. Generally speaking, network traffic between server computers may pass through one or more switches over links. The links between communication ports are wired connections.

For redundancy and increased bandwidth, two or more links may be aggregated together as a single logical link. However, setting up communication ports for link aggregation is relatively complicated, tedious, and error-prone.

SUMMARY

In one embodiment, a computer network includes a server computer having communication ports that are wired to switch ports of two separate network switches. The network switches receive link layer discovery protocol (LLDP) packets from other network devices, and automatically aggregate corresponding switch ports into a port channel aggregation based on the contents of the LLDP packets.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
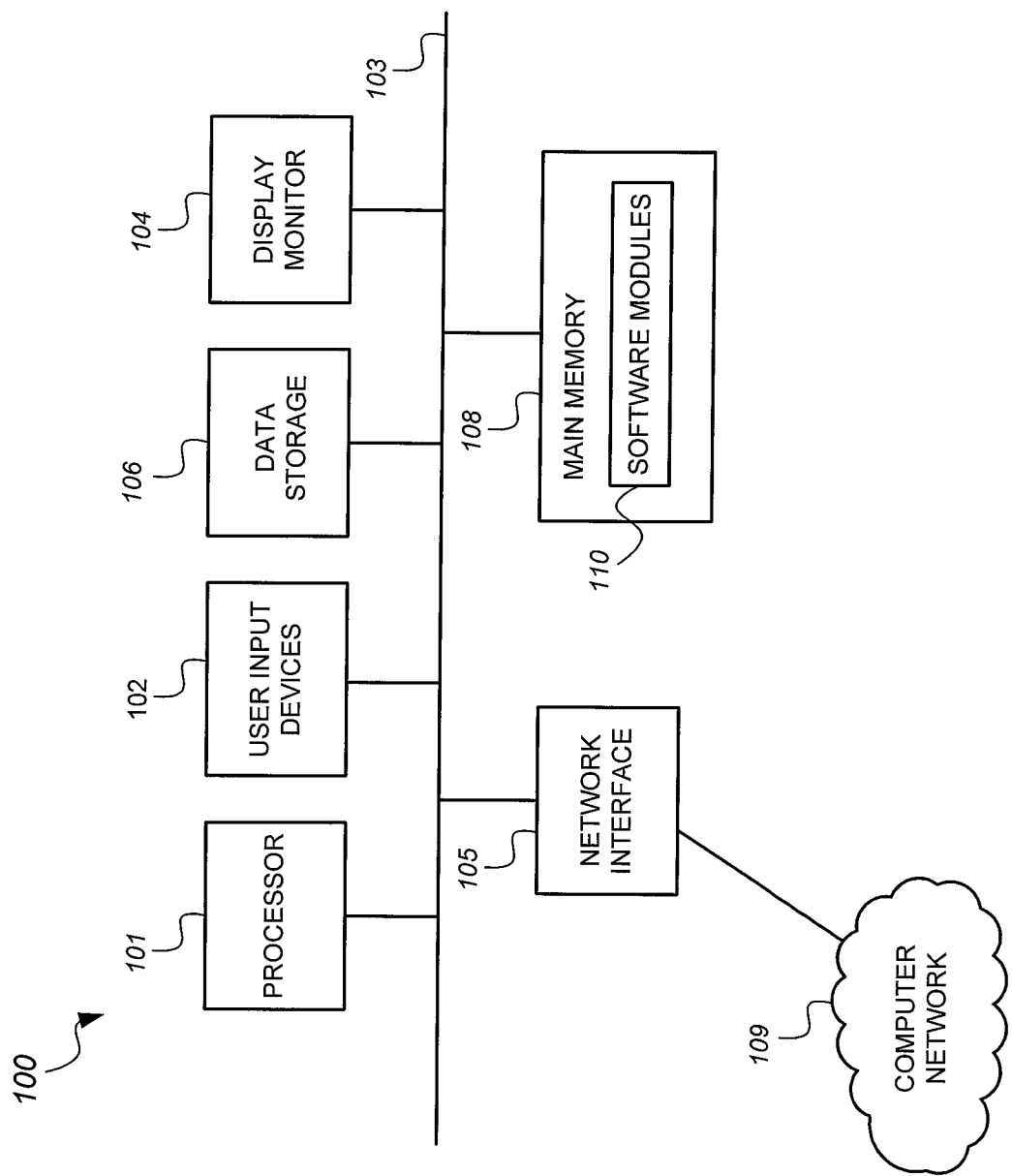
FIG. 1 shows a schematic diagram of a computer system that may be employed with embodiments of the present invention.

Referring now to FIG. 1, there is shown a schematic diagram of a computer system 100 that may be employed with embodiments of the present invention. The computer system 100 may be employed as a network switch or other computers described below. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110. In the example of FIG. 1, the software modules 110 comprise aggregation modules when the computer system 100 is employed as a network switch.

Figure 2:
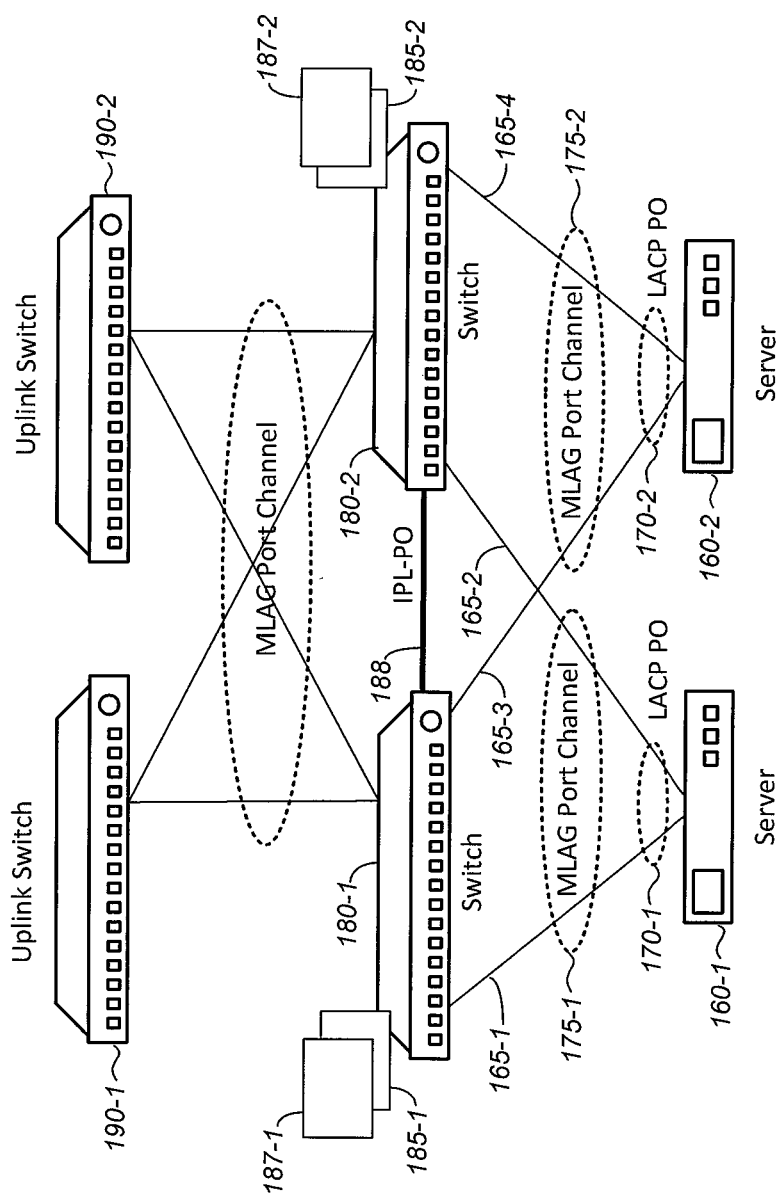
FIG. 2 shows a logical diagram of a computer network in accordance with an embodiment of the present invention.

FIG. 2 shows a logical diagram of a computer network in accordance with an embodiment of the present invention. In one embodiment, the computer network comprises one or more server computers 160 (160-1, 160-2, . . . ), a plurality of network switches 180 (180-1, 180-2, . . . ), and one or more network switches 190 (190-1, 190-2, . . . ).

A network switch 190 is also referred to as an uplink network switch in that the network switch 190 is downstream of the network switches 180 relative to the server computers 160. A network switch 190 may be a conventional network switch, such as those available from Cisco Systems Inc. and other network device vendors. Generally speaking, a network switch, such as a network switch 190 or 180, is adapted to receive, process, and forward data packets by packet switching. As will be more apparent below, a network switch 180 is further adapted to perform automatic multi-chassis link aggregation configuration.

A server computer 160 may comprise a conventional server computer, such as those available from Super Micro Computer, Inc. of San Jose, Calif. In one embodiment, a plurality of server computers 160 and a plurality of network switches 180 are mounted in the same equipment rack. In that embodiment, the server computers 160 comprise blade servers. The switches 190 may also be installed in the same equipment rack as the servers 160 and network switches 180. It is to be noted that only two server computers 160, two network switches 180, and two network switches 190 are shown in FIG. 2 for illustration purposes. The number of network devices that may be incorporated in embodiments of the present invention depends on the particulars of the computer network.

A link is a physical connection that connects communication ports of network devices. In the example of FIG. 2, a link 165 (165-1, 165-2, 165-3, 165-4, . . . ) connects a network interface card (NIC) port of a server computer 160 to a switch port of a network switch 180. A link 165 may comprise an Ethernet cable, a backplane connection, or other wired connection between a server computer 160 and a network switch 180. In one embodiment, the computer network of FIG. 2 allows for link aggregation in accordance with the Link Aggregation Control Protocol (LACP). Other link aggregation protocols may also be used without detracting from the merits of the present invention.

In the example of FIG. 2, the links 165-1 and 165-2 are connected to NIC ports of the server computer 160-1 that are aggregated together as a single LACP port channel aggregation (PO) 170-1. The port channel aggregation 170-1 combines the links 165-1 and 165-2 into a single logical link. Accordingly, data packets (or other network traffic) addressed to the port channel may be transported over the link 165-1 or 165-2. Similarly, the links 165-3 and 165-4 are connected to NIC ports of the server computer 160-2 that are aggregated together as a single LACP port channel aggregation 170-2, combining the links 165-3 and 165-4 into a single logical link.

Generally speaking, two or more links 165 may be aggregated into a single logical link by teaming or bonding their corresponding NIC ports together at a server computer 160. During the NIC teaming/bonding procedure, an administrator manually configures two or more NICs of a server computer 160 to form a single port channel. Data addressed to the port channel may be transported through NIC ports (and thus links 165) that are members of the port channel aggregation.

In one embodiment, the network switch 180-1 and the network switch 180-2 are physically separate network devices, each with its own separate chassis. For improved fault tolerance, two or more links 165 may be aggregated together to two or more network switches 180 in a so-called multi-chassis link aggregation (MLAG). MLAG involves combining two or more switch ports of separate network switches into a single MLAG port channel. In the example of FIG. 2, to aggregate the links 165-1 and 165-2 into a single logical link, the switch port of the network switch 180-1 connected to the link 165-1 and the switch port of the network switch 180-2 connected to the link 165-2 are setup to form an MLAG port channel aggregation 175-1. Similarly, the switch port of the network switch 180-1 connected to the link 165-3 and the switch port of the network switch 180-2 connected to the link 165-4 are setup to form an MLAG port channel aggregation 175-2. Links between the network switches 180 and uplink network switches 190 may also be aggregated in the same manner. Switch ports that belong to particular port channel aggregations are indicated in an aggregation table 185 (185-1, 185-2, . . . ) of a network switch 180.

Figure 3:
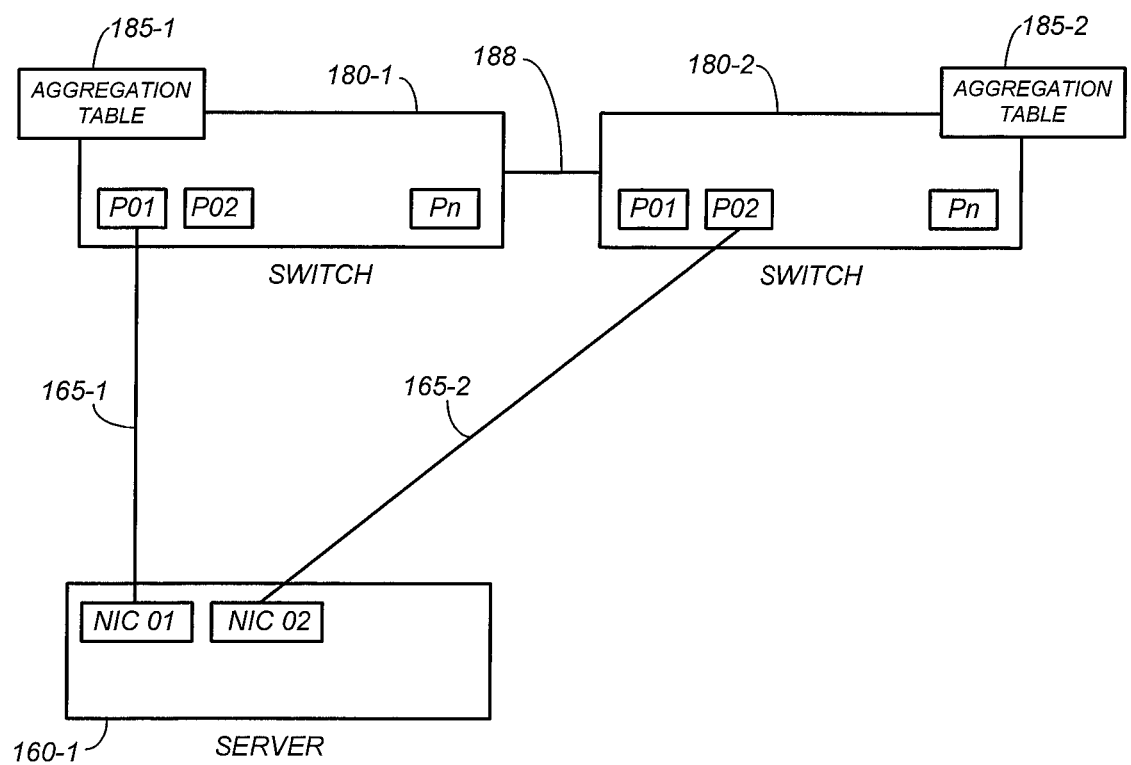
FIG. 3 shows example link connections between a server computer and network switches in the computer network of FIG. 2, in accordance with an embodiment of the present invention.

FIG. 3 shows example link connections between the server computer 160-1 and the network switches 180-1 and 180-2 in accordance with an embodiment of the present invention. The link connections between the server computer 160-2 and the network switches 180-1 and 180-2 are similar, and are thus omitted in FIG. 3 for clarity of illustration.

In the example of FIG. 3, the link 165-1 connects the NIC port NIC 01 of the server computer 160-1 to the switch port P01 of the network switch 180-1, and the link 165-2 connects the NIC port NIC 02 of the server computer 160-1 to the switch port P02 of the network switch 180-2. At the server computer 160-1, the NIC ports NIC 01 and NIC 02 are members of the same LACP port channel aggregation 170-1 (see FIG. 2, 170-1).

In one embodiment, the pair of network switches 180-1 and 180-2 are configured as MLAG peer network devices and share the same system identifier. This allows the server computer 160-1 to treat the pair of network switches 180-1 and 1802 as a single network switch for aggregation setup. In the example of FIG. 3, the switch port P01 of the network switch 180-1 and the switch port P02 of the network switch 180-2 belong to the same MLAG port channel aggregation 175-1. The network switches 180-1 and 180-2 may communicate with each other by way of a dedicated inter-peer link (IPL) 188.

Each MLAG port channel aggregation may have an addressable port channel number and an associated system identifier that identifies the network switches that house the switch ports that are members of the MLAG port channel aggregation. Each MLAG port channel aggregation may also have a unique aggregation key for identifying the MLAG port channel aggregation. An MLAG port channel aggregation would have the same port channel number and same system identifier regardless of the network switch 180 that created the MLAG port channel aggregation.

A network switch 180 is assigned an MLAG peer role, which identifies the network switch as either a primary switch or a secondary switch. In one embodiment, the network switch with the lower Media Access Control (MAC) address is designated as the primary switch, and the other network switch is designated as the secondary switch. Each network switch 180 is also assigned a unique switch identifier. The peer role and switch identifier of a network switch 180 may be designated during MLAG establishment. In the present disclosure, for illustration purposes, the network switch 180-1 is assigned the switch identifier 1 and designated as a primary switch, and the network switch 180-2 is assigned the switch identifier 2 and designated as a secondary switch.

In one embodiment, a primary switch does not follow MLAG configurations made by the secondary switch. That is, the primary switch creates port channel aggregations without regard to port channel aggregations created by the secondary switch, and the secondary switch simply follows port channel aggregations made by the primary switch. In one embodiment, if a port channel exists only on a secondary switch, the secondary switch may create the port channel regardless of the primary switch.

Generally speaking, the procedure for configuring port channel aggregations in network switches involves many steps. Configuring a port channel aggregation involves creating the port channel aggregation, adding member switch ports to the port channel aggregation, and enabling MLAG on the port channel aggregation. These steps need to be repeated for each switch port on each network switch. In some computer networks, there may be 20 to 40 server computers that are connected to a network switch. This requires configuring 20 to 40 port channel aggregations in any network switch, increasing the complexity of the configuration procedure. Worse, an incorrect configuration prevents data packets from being switched correctly to their destination, resulting in hours of network downtime and troubleshooting.

As shown in FIG. 2, each network switch 180 may include aggregation modules 187 (187-1, 187-2, . . . ), which are adapted to perform automatic link aggregation configuration from received link aggregation control packets. A link aggregation control packet, such as an LACP packet, contains link aggregation information. The link aggregation information in an LACP packet may include an actor aggregation key (aggregation key on the sender side), an actor system identifier (system identifier of the sender), a partner aggregation key (aggregation key on the receiver side), and a partner system identifier (system identifier of the receiver). As a particular example, for an LACP packet received by the network switch 180-1 from the server computer 160-1, the actor aggregation key is the aggregation key for the port channel aggregation 170-1, the actor system identifier is the system identifier of the server computer 160-1, the partner aggregation key is the aggregation key for the MLAG port channel aggregation 175-1, and the partner system identifier is the system identifier of the network switch 180-1.

In one embodiment, a network switch 180 receives network traffic at a switch port. The aggregation modules 187 are adapted to receive a link aggregation control packet at the switch port, and create a port channel aggregation including the switch port when the switch port is not part of a port channel aggregation.

Figure 4:
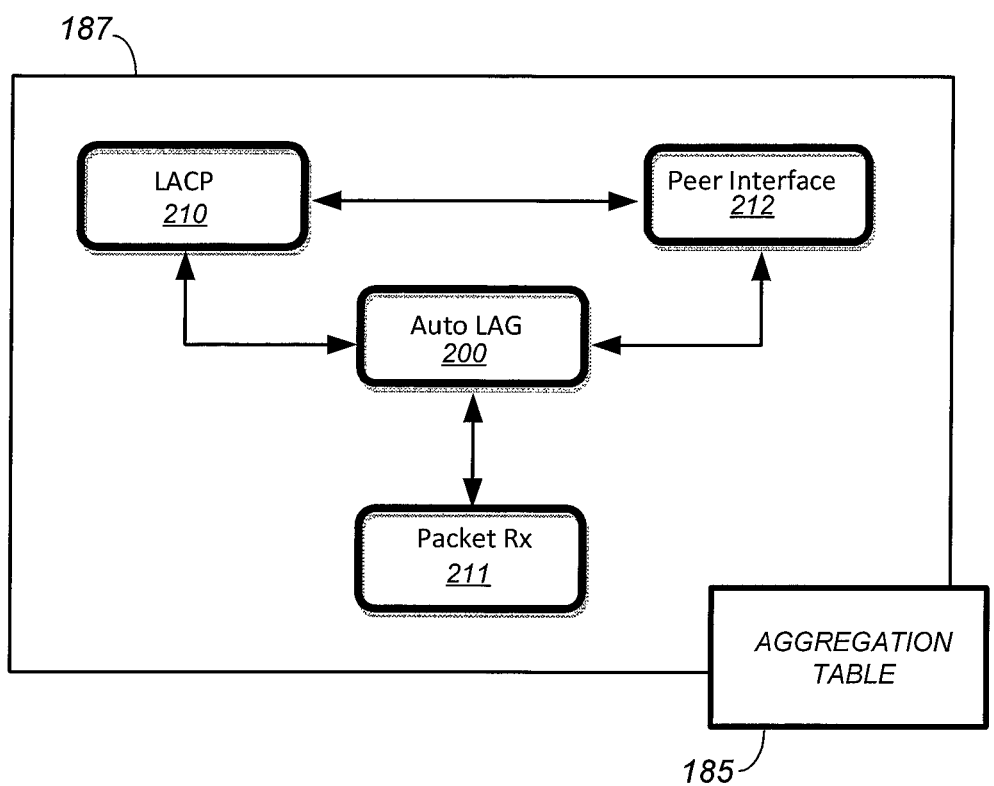
FIG. 4 shows a logical diagram of aggregation modules in accordance with an embodiment of the present invention.

FIG. 4 shows a logical diagram of aggregation modules 187 in accordance with an embodiment of the present invention. Each network switch 180 has its own aggregation modules 187 and aggregation table 185.

In one embodiment, the aggregation modules 187 comprise an LACP module 210, a peer interface 212, a packet receiver 211, and an automatic link aggregation (LAG) module 200. In one embodiment, the components of the aggregation modules 187 are implemented in software. In other embodiments, one or more components of the aggregation modules 187 are implemented in hardware (e.g., application-specific integrated circuit; field programmable gate array; logic gates) or a combination of hardware and software.

Conventional network devices that are compliant with the LACP and support MLAG have an LACP module, peer interface, and packet receiver. In embodiments of the present invention, the LACP module 210, peer interface 212, and packet receiver 211 perform the functionality of corresponding components in LACP-compliant network devices, but are modified to work with an automatic LAG module 200. Such modifications may include adding one or more interfaces to send and receive data to and from the automatic LAG module 200 and additional logic or procedure to work with the automatic LAG module 200 as described below.

In one embodiment, the packet receiver 211 handles the receiving and processing of control packets received at a switch port of the network switch 180. The packet receiver 211 may be implemented from a pre-existing packet receiver by modifying the pre-existing packet receiver to forward received LACP packets to the automatic LAG module 200, instead of directly to the LACP module 210.

In one embodiment, the LACP module 210 manages the creation and deletion of port channel aggregations and processing of LACP packets for active switch port channel interfaces. The LACP module 210 communicates with the peer network switch 180 by way of the peer Interface 212. The LACP module 210 may be implemented from a pre-existing LACP module by modifying the pre-existing LACP module to communicate with the automatic LAG module 200. In conventional network devices that support LACP, the pre-existing LACP module receives configuration instructions from manual keyboard entries made by a user or from a management interface, such by Simple Network Management Protocol (SNMP). In embodiments of the present invention, a pre-existing LACP module is modified to receive configuration instructions from the automatic LAG module 200. The automatic LAG module 200 may create a port channel aggregation, add a member switch port to the port channel aggregation, remove a member switch port from the port channel aggregation, and delete the port channel aggregation by so instructing the LACP module 210.

In one embodiment, the peer interface 212 manages the communication between peer network devices to create, delete, and maintain MLAG interfaces across peers. The peer interface 212 also maintains the list of MLAG interfaces active in peer network devices. The peer interface 212 may be implemented from a pre-existing peer interface by modifying the pre-existing peer interface to notify the automatic LAG module 200 on the reception of peer MLAG changes and also to respond to queries requested by the automatic LAG module 200. The peer interface 212 and the LACP module 210 update the aggregation table 185 for any changes to MLAG configurations.

In one embodiment, the automatic LAG module 200 is adapted to receive LACP packets from the packet receiver 211 and to automatically perform MLAG configuration based on the received LACP packets. The automatic LAG module 200 may perform MLAG configuration based on received LACP packets by creating and deleting port channel aggregations, and by adding and removing a switch port to and from a port channel aggregation.

Figure 5:
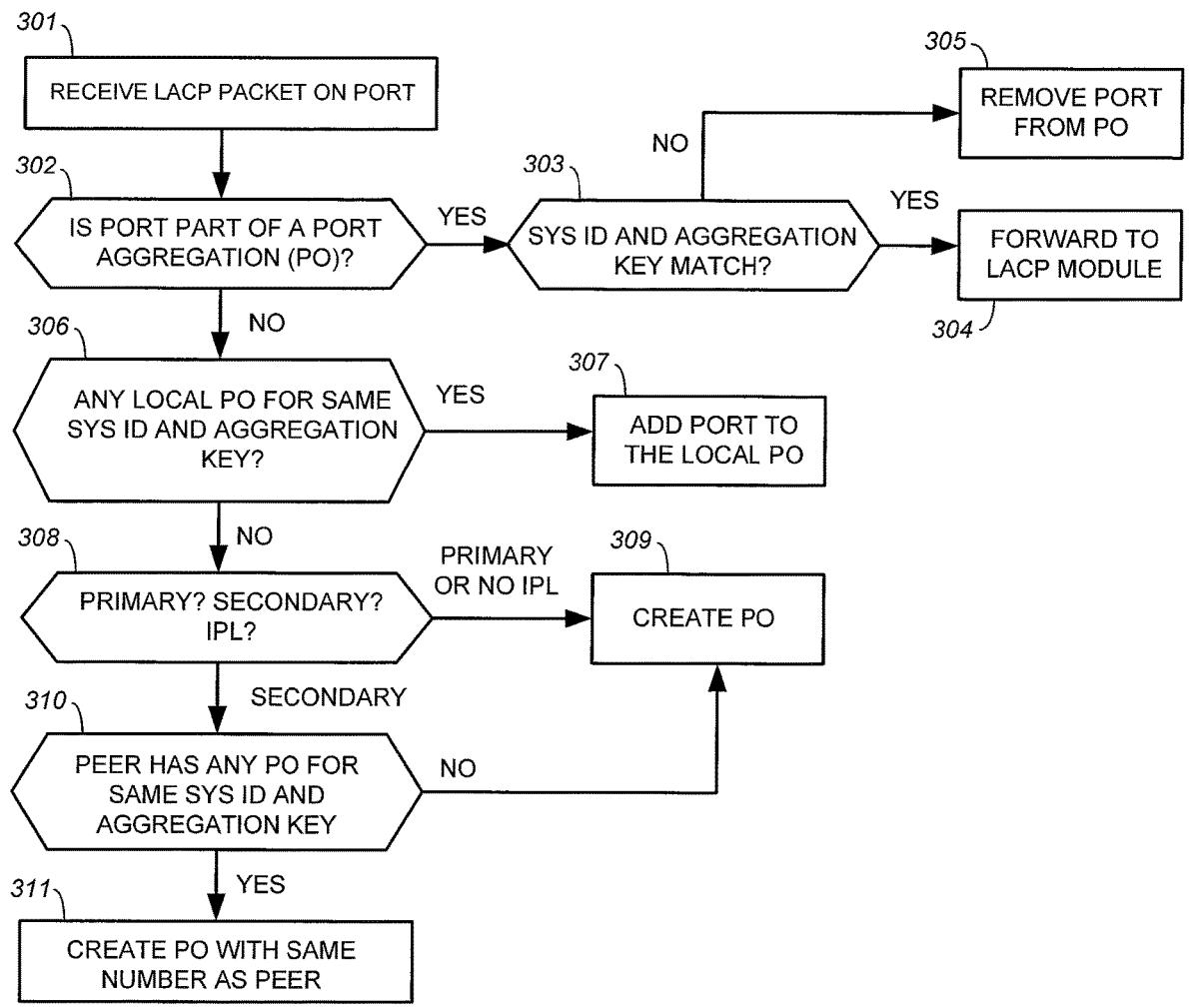
FIG. 5 shows a flow diagram of a computer-implemented method of automatically performing MLAG configurations in accordance with an embodiment of the present invention.

FIG. 5 shows a flow diagram of a computer-implemented method of automatically performing MLAG configurations in accordance with an embodiment of the present invention. The method of FIG. 5 may be performed by the automatic LAG module 200 in conjunction with previously disclosed components. Other components may also be employed without detracting from the merits of the present invention In the example of FIG. 5, an LACP packet is received at a switch port of a network switch 180 (step 301). The packet receiver 211 provides the LACP packet to the automatic LAG module 200.

The automatic LAG module 200 checks if the switch port is a member of a currently-existing port channel aggregation (step 302). The automatic LAG module 200 may check the switch port against member switch ports of port channel aggregations to do so.

When the switch port is a member of a port channel aggregation, the automatic LAG module 200 checks if the partner system identifier and partner aggregation key indicated in the LACP packet matches those of the port channel aggregation (step 303). When the port channel aggregation and LACP packet have matching partner system identifier and partner aggregation key, the automatic LAG module 200 deems the LACP packet to be a regular LACP handshake for an existing port channel aggregation and accordingly forwards the LACP packet to the LACP module 210 (step 303 to step 304). Otherwise, the automatic LACP module 200 declares a mismatch, and accordingly removes the switch port from the port channel aggregation (step 303 to step 305). The LACP module 200 deletes the port channel aggregation when the port channel aggregation does not have any remaining member switch ports.

When the switch port is not a member of any port channel aggregation, the automatic LAG module 200 checks for presence of any local (i.e., in the same network switch 180) port channel aggregation having the same partner system identifier and partner aggregation key as in the LACP packet (step 306). If so, the automatic LAG module 200 adds the switch port to the local port channel aggregation (step 307).

When there is no local port channel aggregation having the same partner system identifier and partner aggregation key as in the LACP packet (step 306 to step 308), the automatic LAG module 200 queries the peer interface 212 to determine the peer role (i.e., whether primary or secondary) of the network switch 180 that received the LACP packet and the status of the inter-peer link 188 (step 308).

When the inter-peer link 188 is not active (indicating there is no active corresponding peer network switch) or the network switch 180 is a primary switch (step 308 to step 309), the automatic LAG module 200 requests the LACP module 210 to create a new port channel aggregation and add the switch port to the new port channel aggregation (step 309). In one embodiment, the port channel number of the new port channel aggregation may be in the form of "<sw-id><ifndex>", where sw-id is the switch identifier of the network switch 180 and "ifndex" is the switch port number.

When the network switch 180 is a secondary switch (step 308 to step 310), the automatic LAG module 200 queries the peer interface 212 to determine if the peer network switch has a port channel aggregation with the same partner system identifier and partner aggregation key as in the LACP packet. In other words, when the network switch 180 is a secondary switch, the automatic LAG module 200 checks whether the primary switch has a port channel aggregation with the same partner system identifier and partner aggregation key as in the LACP packet. If so, the automatic LAG module 200 creates a port channel aggregation with the same port channel number as that of the primary network switch and adds the switch port to that port channel aggregation (step 310 to step 311). If not, the automatic LAG module 200 requests the LACP module 210 to create a new port channel aggregation and adds the switch port to the new port channel aggregation (step 310 to step 309). In one embodiment, the new port channel aggregation has the port channel number "<sw-id><ifndex>", where sw-id is the switch identifier of the network switch 180 and "ifndex" is the switch port number.

As a particular example, assuming the network switch 180-2 is a secondary switch that received the LACP packet, the automatic LAG module 200 of the network switch 180-2 queries its peer interface 212 to determine if the network switch 180-1 (the primary switch) has a port channel aggregation with the same partner system identifier and partner aggregation key as in the LACP packet (step 308 to step 310). If so, the automatic LAG module 200 creates a port channel aggregation with the same port channel number as that of the network switch 180-1 and adds the switch port to that port channel aggregation (step 310 to step 311). If not, the automatic LAG module 200 requests the LACP module 210 to create a new port channel aggregation and adds the switch port to the new port channel aggregation (steps 310 to step 309).

Figure 6:
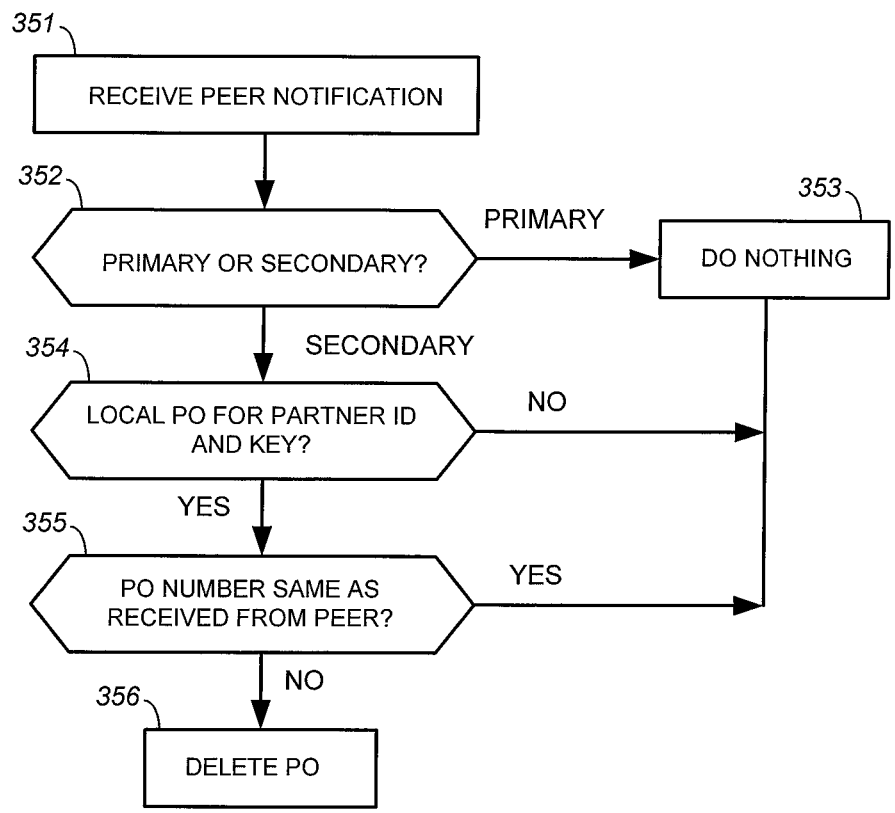
FIG. 6 shows a flow diagram of a method of maintaining MLAG configurations between a primary network switch and a secondary network switch in accordance with an embodiment of the present invention.

FIG. 6 shows a flow diagram of a method of maintaining MLAG configurations between a primary network switch and a secondary network switch in accordance with an embodiment of the present invention. The method of FIG. 6 may be performed by the automatic LAG module 200 in conjunction with previously disclosed components. Other components may also be employed without detracting from the merits of the present invention.

In one embodiment, a peer interface 212 sends a peer notification to the automatic LAG module 200 whenever the peer interface 212 receives a port channel aggregation update from a peer network switch. As a particular example, a peer interface 212 of the network switch 180-1 may receive a port channel aggregation update (e.g., port channel aggregation creation or deletion) from a peer interface 212 of the network switch 180-2. In that example, the peer interface 212 of the network switch 180-1 may notify the automatic LAG module 200 of the network switch 180-1 by sending a peer notification. In one embodiment, a peer notification includes a partner system identifier, partner aggregation key, and port channel number of the port channel aggregation that is the subject of the port channel aggregation update.

In the example of FIG. 6, an automatic LAG module 200 receives a peer notification from a peer interface 212 (step 351). The automatic LAG module 200 responds to the peer notification depending on the peer role of the network switch 180. When the network switch 180 is a primary switch (step 352 to step 353), the automatic LAG module 200 simply discards the peer notification (step 353). This is because a primary switch makes MLAG configurations without regard to the secondary switch it is peered with.

When the network switch 180 is a secondary switch, the automatic LAG module 200 checks for an existing local port channel aggregation with the same partner system identifier and partner aggregation key indicated in the peer notification (step 352 to step 354). The automatic LAG module 200 discards the peer notification if there is no local port channel aggregation with the same partner system identifier and partner aggregation key as those indicated in the peer notification (step 354 to step 353).

When the network switch 180 is a secondary switch and there is a local port channel aggregation with the same partner system identifier and partner aggregation key as those indicated in the peer notification (step 354 to step 355), the automatic LAG module 200 checks if the port channel number of the local port channel aggregation matches that indicated in the peer notification (step 355). If so, the automatic LAG module 200 simply discards the peer notification (step 355 to step 353). Otherwise, when the port channel number of the local port channel aggregation does not match that indicated in the peer notification (step 355 to step 356), the automatic LAG module 200 deletes the local port channel aggregation.

In one embodiment, the peer interface 212 provides the status of the inter-peer link 188 to the automatic LAG module 200. When the automatic LAG module 200 finds that the inter-peer link 188 is down, the automatic LAG module 200 deletes all of the port channel aggregations created by the automatic LAG module 200. This deletion allows the port channel aggregations to be automatically re-configured correctly after the inter-peer link 188 goes down. The automatic LAG module 200 may also delete a port channel aggregation created by the automatic LAG module 200 when the port channel aggregation goes down due to missing LACP packets. In general, the actions performed by the automatic LAG module 200 to recover from an inter-peer link going down or other system failure may depend on the particulars of the computer network.

In one embodiment, switch ports that are candidates for automatic MLAG configuration are screened based on the network manager that manages the corresponding network switch. Links that are connected to network switches that are not managed by a particular network manager are treated in a conventional manner (i.e., not automatically configured into an MLAG), whereas links that are connected to network devices that are managed by the particular network manager are automatically configured into an MLAG. This prevents automatic MLAG configuration for switch ports that are connected to unauthorized or not-controllable network devices. This embodiment of the present invention is now explained beginning with FIG. 7.

Figure 7:
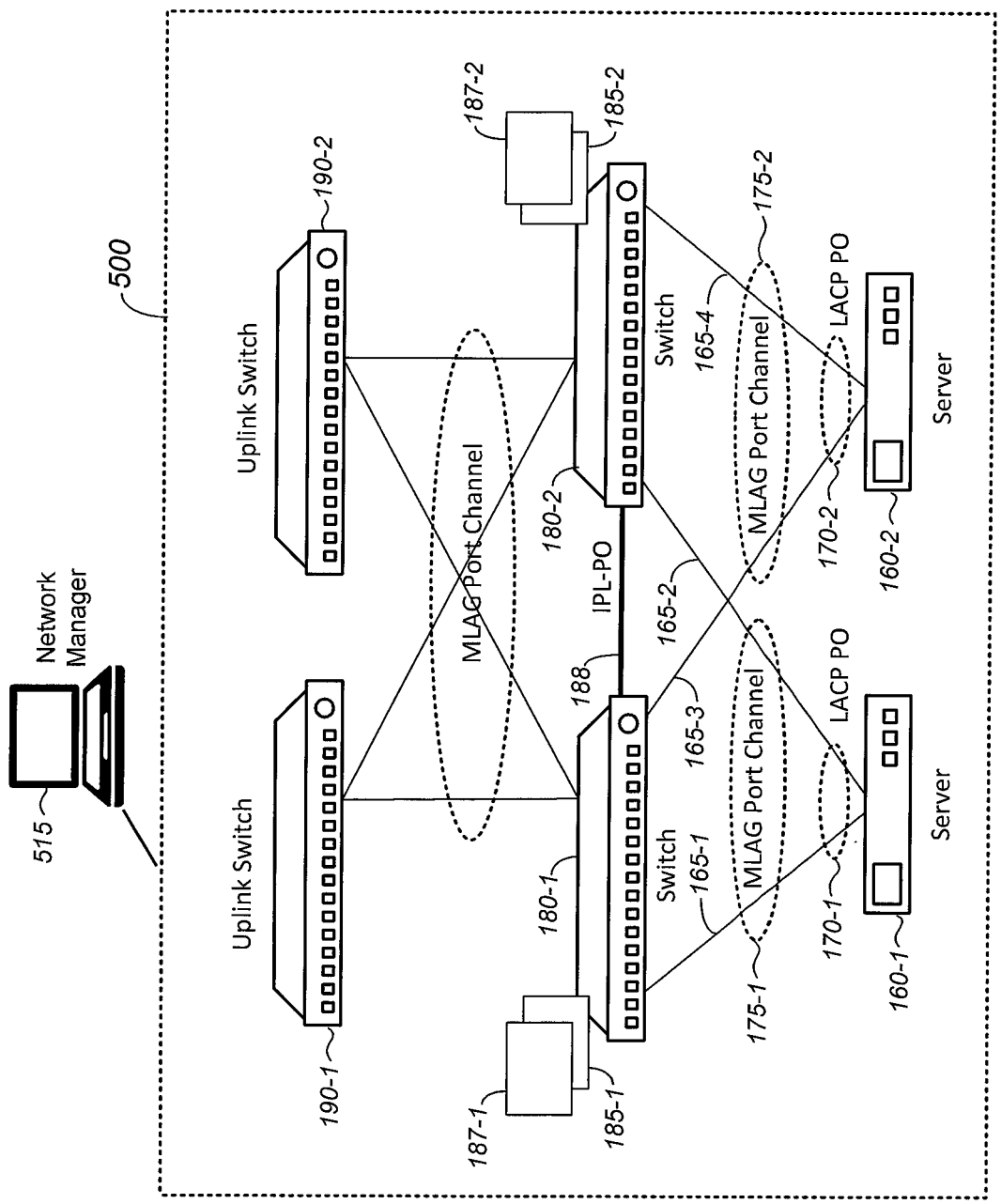
FIG. 7 shows a logical diagram of a computer network with link layer discovery, in accordance with an embodiment of the present invention.

FIG. 7 shows a logical diagram of a computer network with link layer discovery, in accordance with an embodiment of the present invention. In one embodiment, the link layer discovery is by the Link Layer Discovery Protocol (LLDP).

In the example of FIG. 7, a network manager 515 is adapted to manage one or more network devices of a computer network 500. Generally speaking, a network manager is adapted to discover, provision, and monitor the managed network devices.

The network manager 515 may comprise a computer system that runs a network management software. The network manager 515 may be adapted to manage the network devices of the computer network 500 in accordance with a network management protocol, e.g., SNMP.

In the example of FIG. 7, the computer network 500 is similar to the computer network of FIG. 2. The general operation of the network devices of the computer network 500 is as previously described and is thus not repeated here in the interest of clarity. As explained, automatic MLAG configuration may be performed by the network switches 180. In the example of FIG. 7, the network switches 180 and 190 are further compliant with LLDP.

In the example of FIG. 7, a network switch 190 may or may not be managed by the network manager 515. When the network switch 190 is managed by the network manager 515, a corresponding network switch 180 is adapted to automatically perform an MLAG configuration involving the switch port connected to the network switch 190 as previously described. There are scenarios where the network switch 190 is not managed by the network manager 515, such as when the network switch 190 is managed by another network manager or has no associated network manager. When the network switch 190 is not managed by the network manager 515, automatic MLAG configuration is not performed for a switch port of the network switch 180 that is linked to the network switch 190.

Figure 8:
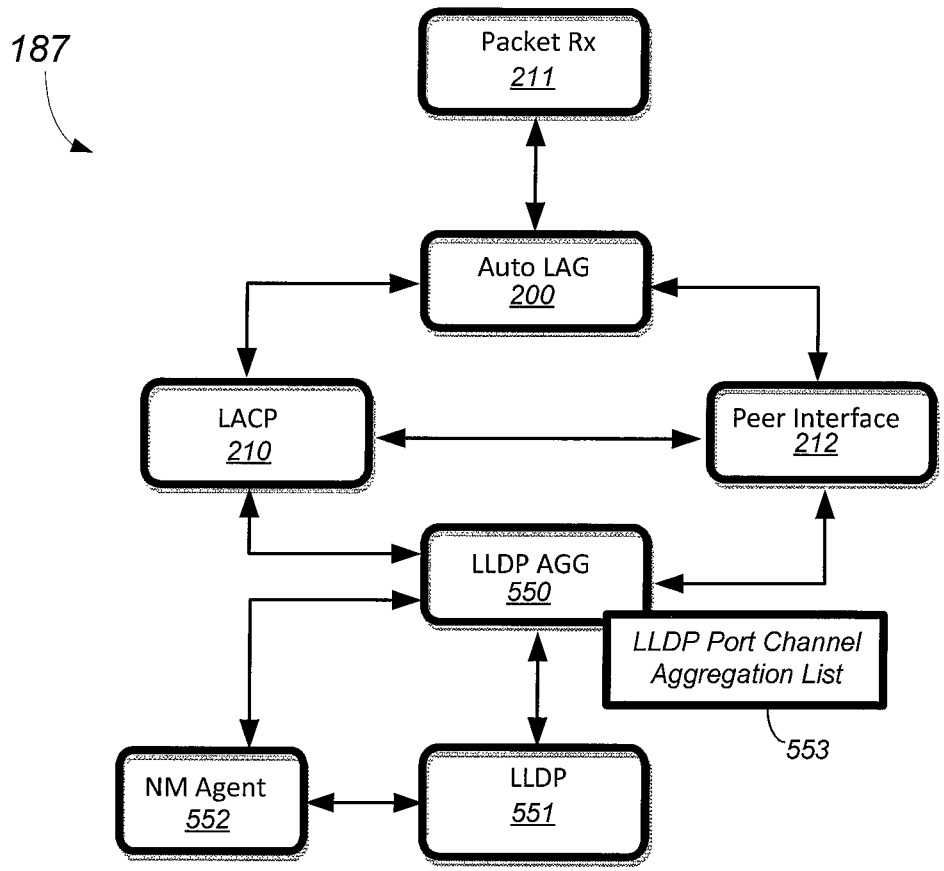
FIG. 8 shows a logical diagram of aggregation modules of a network switch in accordance with an embodiment of the present invention.

FIG. 8 shows a logical diagram of aggregation modules 187 of a network switch 180 in accordance with an embodiment of the present invention. The aggregation modules 187 of FIG. 8 are the same as the aggregation modules 187 of FIG. 4, except for some modifications to the LACP module 210 and peer interface 212, and the addition of a network manager agent 552, an LLDP module 551, and an LLDP aggregation module 550. The automatic LAG module 200 and packet receiver 211 work in conjunction with the LACP module 210 and the peer interface 212 to perform MLAG configuration based on received LACP control packets. The network manager agent 552, LLDP module 551, and LLDP aggregation module 550 perform MLAG configuration based on received LLDP packets.

Conventional network devices that are compliant with LLDP and support SNMP typically have a network manager agent and an LLDP module. The same is true for other network managers (e.g., REST-based network managers). In embodiments of the present invention, the network manager agent 552 and LLDP module 551 perform the functionality of corresponding components in conventional LLDP and SNMP network devices, but are modified to work with the LLDP aggregation module 550. Such modifications may include adding one or more interfaces to send and receive data to and from the LLDP aggregation module 550 and additional logic or procedure to work with the LLDP aggregation module 550 as described below.

In one embodiment, the network manager agent 552 is an agent of the network manager 515. The network manager agent 552 may be implemented from a pre-existing network manager agent by modifying the pre-existing network manager agent to provide network management information, such as particulars of the network manager 515, to the LLDP aggregation module 550.

In one embodiment, the LLDP module 551 processes LLDP packets in accordance with LLDP and is adapted to handle organization specific TLV (Type-Length Value) information indicated in the LLDP packets. The LLDP module 551 may be implemented from a pre-existing LLDP module by modifying the pre-existing LLDP module to pass LLDP packets to the LLDP aggregation module 550, after the LLDP module 551 performs its own LLDP processing on the LLDP packets.

The LACP module 210 operates as previously described. In the example of FIG. 8, the LACP module 210 is further adapted to receive configuration instructions from the LLDP aggregation module 550. The LLDP aggregation module 550 may create a port channel aggregation, add a member switch port to the port channel aggregation, remove a member switch port from the port channel aggregation, and delete the port channel aggregation by so instructing the LACP module 210. In one embodiment, the LLDP aggregation module 550 is adapted to maintain an LLDP port channel aggregation list 553, which lists the port channel aggregations created by the LLDP aggregation module 550. A port channel aggregation created by the LLDP aggregation module 550 may include a corresponding partner system identifier and network management TLV. The LLDP aggregation module 550 may assign port channel numbers in the form "<sw-id><ifindex>", where sw-id is the switch identifier of the network switch 180 and "ifindex" is the switch port number, as previously described.

The peer interface 212 operates as previously described. In the example of FIG. 8, the peer interface 212 is further adapted to notify the LLDP aggregation module 550 on the reception of peer MLAG changes and also to respond to queries requested by LLDP aggregation module 550.

In one embodiment, the LLDP aggregation module 550 is adapted to receive from the LLDP module 551 all LLDP packets that have been processed by the LLDP module 551.

At startup, the LLDP aggregation module 550 is adapted to query the network manager agent 552 for status of communications with its associated network manager, which in this example is the network manager 515. The network manager agent 552 provides the LLDP aggregation module 550 the particulars of the network manager 515 including the identity of the network manager 515. The identity of the network manager 515 may be in terms of its Internet Protocol (IP) address, domain name, or other unique identifier. The network manager agent 552 is adapted to notify the LLDP aggregation module 550 when the identity of the network manager 515 changes or when the network manager 515 starts or stops managing the network device 180. The LLDP aggregation module 550 maintains the current particulars of the network manager 515.

An LLDP packet has a plurality of TLVs, with each TLV having a particular type. LLDP provides for a TLV type 127 that allows for an organization-specific TLV, which in one embodiment is employed as a network management TLV. In one embodiment, the network management TLV has an identifiable format and has the following information: (a) identity of the network manager 515 and (b) network device system identifier for LACP/MLAG. In one embodiment, the network device system identifier is the system identifier of the network switches 180-1 and 180-2. An example network management TLV may have the following format:

| Organization Specific TLV Type = 127 | TLV Length | Organization Unique Identifier—OUI | NM TLV Subtype | Switch management NM Status | NM Domain Name | Switch Identifier | Switch Model |
|---|---|---|---|---|---|---|---| where the "NM Domain Name" field indicates the identity of the network manager 515 and the "Switch Identifier" field indicates the system identifier that is common to both the network switches 180-1 and 180-2.

In one embodiment, the LLDP aggregation module 550 is adapted to add the network management TLV to the LLDP packets when valid network manager information is available, i.e., when particulars of the network manager 515 are available from the network manager agent 552. Otherwise, when the network switch 180 running the LLDP aggregation module 550 is not managed by the network manager 515, the LLDP aggregation module 550 will not add the network management TLV to LLDP data packets.

As a particular example, when the LLDP aggregation module 550 of the aggregation modules 187-1 of the network switch 180-1 receives valid particulars of the network manager 515 (from the network manager agent 552), the LLDP module 550 adds the network management TLV in all LLDP packets that are transmitted out by the LLDP module 551.

In one embodiment, the LLDP aggregation module 550 receives a notification from the network manager agent 552 when there is a change in network management-related information, such as when the network switch 180 is no longer managed by the network manager 515. In that case, the LLDP aggregation module 550 will not add the network management TLV into the LLDP packets. Also, the LLDP aggregation module 550 is adapted to change the information represented by the network management TLV whenever there is a change in the identifier of the network manager 515 (as reported by the network manager agent 552) or there is a change in the system identifier of the network switch 180.

In one embodiment, the LLDP aggregation module 550 is adapted to receive an LLDP packet, scan the LLDP packet for the network management TLV, and automatically perform MLAG configuration based on the received LLDP packet. The LLDP aggregation module 550 may perform MLAG configuration based on received LLDP packet by creating and deleting port channel aggregations and, by adding and removing a switch port to and from a port channel aggregation.

Figure 9:
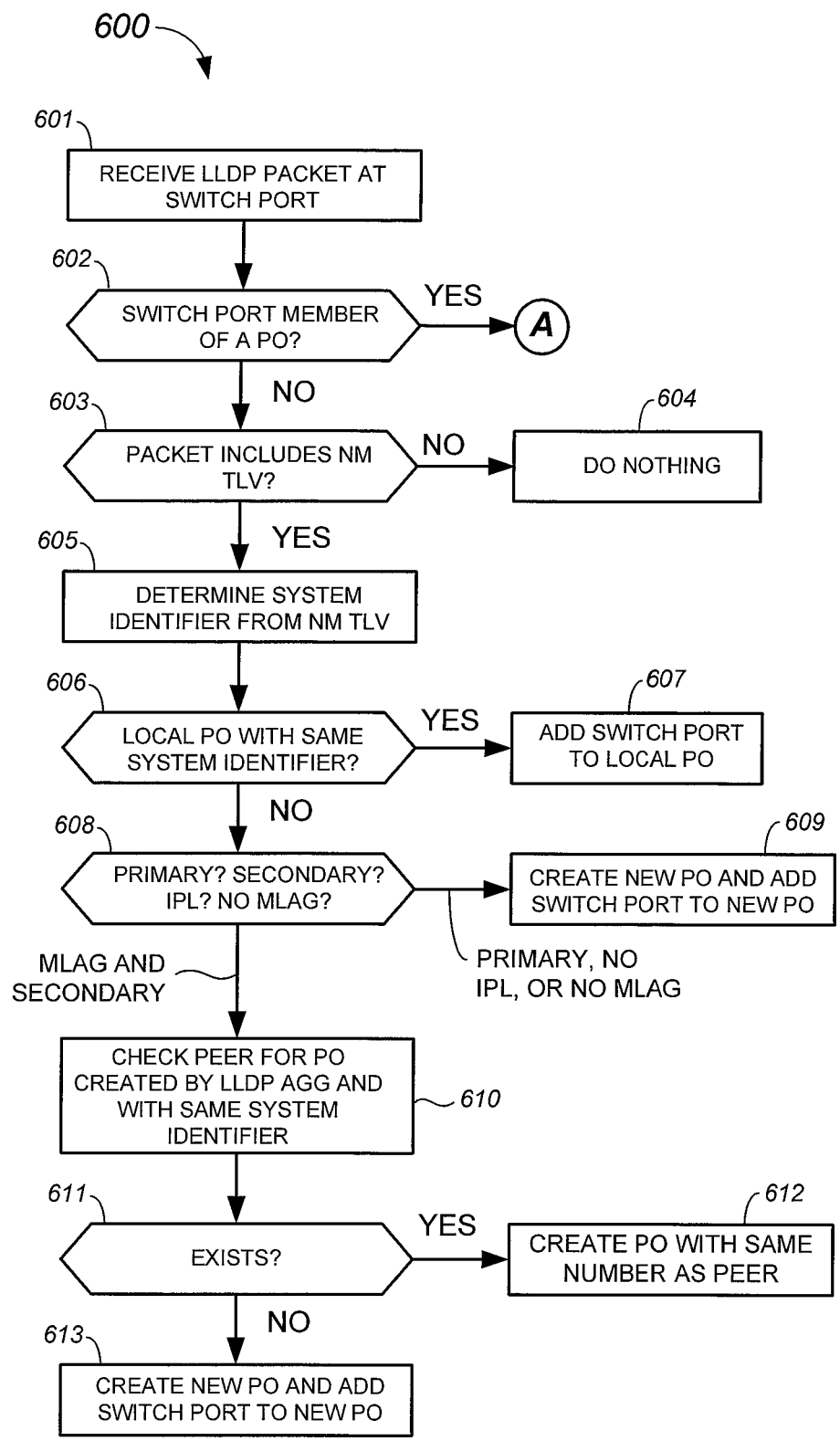
FIGS. 9-11 show a flow diagram of a computer-implemented method of automatically performing multi-chassis link aggregation configurations in accordance with an embodiment of the present invention.
Figure 10:
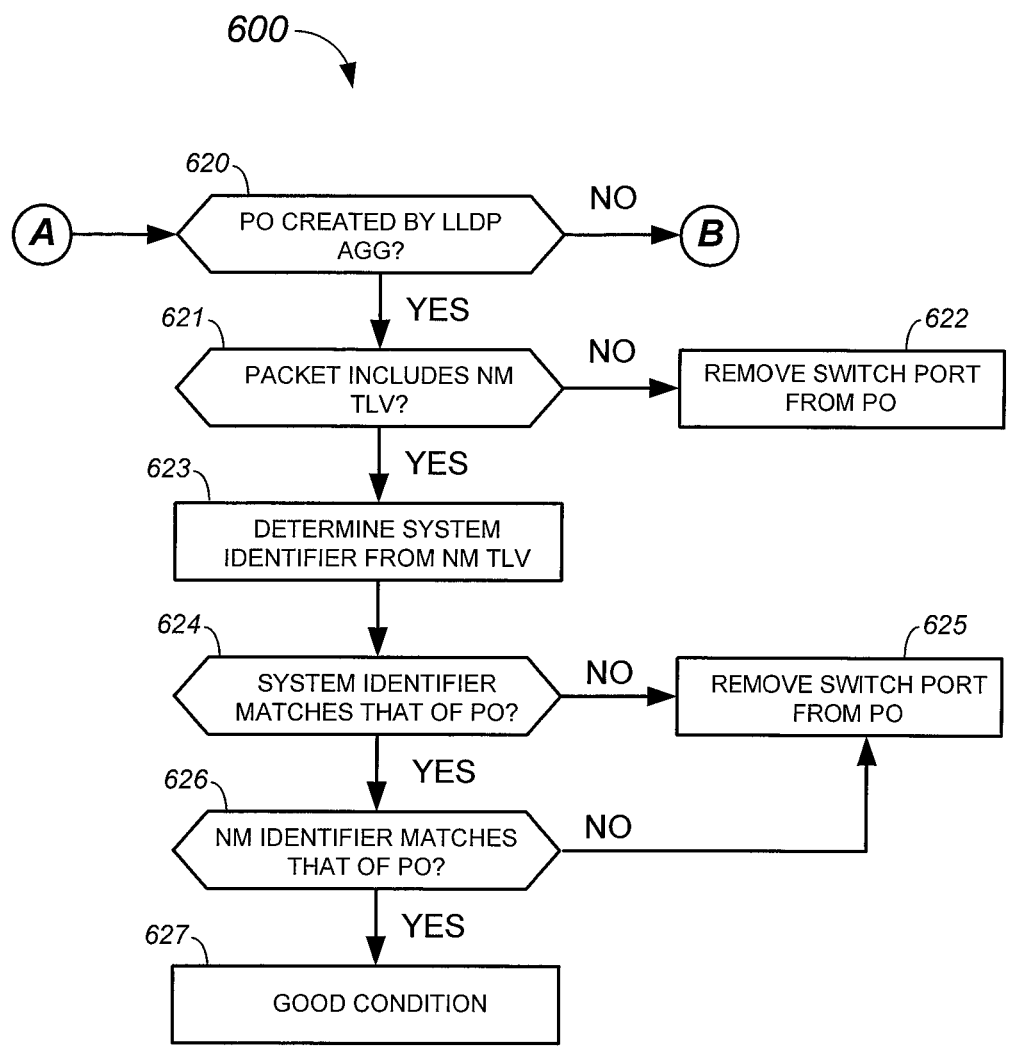
Figure 11:
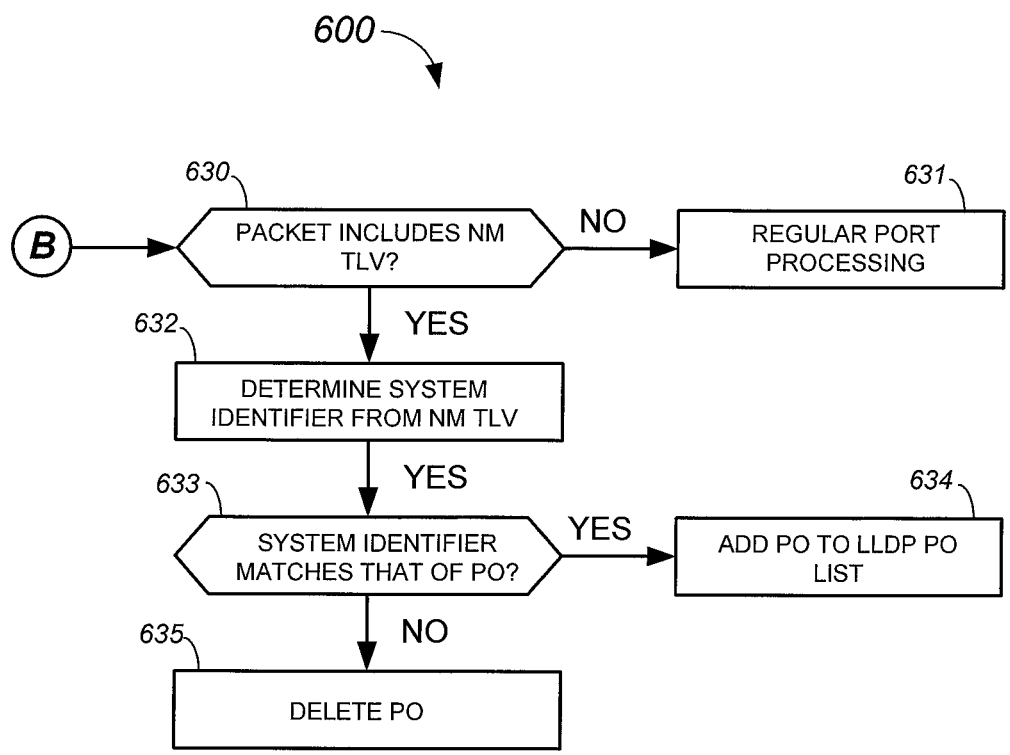

FIGS. 9-11 show a flow diagram of a computer-implemented method 600 of automatically performing MLAG configurations in accordance with an embodiment of the present invention. The method 600 may be performed by the LLDP aggregation module 550 in conjunction with previously disclosed components. Other components may also be employed without detracting from the merits of the present invention.

The method 600 is explained using the network switch 180-1 as an example. Beginning with FIG. 9, an LLDP packet is received at a switch port of the network switch 180-1 (step 601). The LLDP module 551 processes the LLDP packet and thereafter provides the LLDP packet to the LLDP aggregation module 550.

The LLDP aggregation module 550 checks if the switch port that received the LLDP packet is a member of a currently-existing port channel aggregation in the network switch 180-1 (step 602). The LLDP aggregation module 550 may check the switch port against member switch ports of port channel aggregations to do so.

When the switch port is a member of a port channel aggregation, the method 600 continues to step 620 of FIG. 10 (step 602 to step 620; node A of FIG. 9 to node A of FIG. 10).

When the switch port is not a member of a port channel aggregation (step 602 to 603), the LLDP aggregation module 550 checks the LLDP packet for the network management TLV (step 603). When the LLDP packet does not have the network management TLV, the LLDP aggregation module 550 stops the processing of the LLDP packet (step 604). In that case, the switch port is not automatically configured into an MLAG.

The absence of network management TLV indicates that the network switch port is connected to a device that is not managed by the network manager 515. In that case, the LLDP aggregation module 550 deems the LLDP packet to have been transmitted by a network switch that is not managed by the network manager 515. Accordingly, the LLDP aggregation module 550 simply discards the LLDP packet.

Continuing with FIG. 9, when the LLDP packet includes a network management TLV (step 603 to step 605), the LLDP aggregation module 550 determines the system identifier from the network management TLV (step 605). In other words, the LLDP aggregation module 550 decodes the network management TLV to extract the system identifier. The LLDP aggregation module 550 then checks for a local port channel aggregation with the same system identifier as that indicated by the network management TLV (step 606). When a local port channel aggregation with the same system identifier exists (step 606 to step 607), the LLDP aggregation module 550 adds the switch port to the local port channel aggregation (step 607).

When there is no local port channel aggregation with the same system identifier as that indicated by the network management TLV (step 606 to step 608), the LLDP aggregation module 550 queries the peer interface 212 to determine the peer role of the network switch 180-1, to determine the status of the inter-peer link 188, and for presence of any MLAG peer arrangement (step 608). When the network switch 180-1 is a primary switch, there is no inter-peer link 188 (e.g., down), or there is no MLAG peer arrangement involving the network switch 180-1 (step 608 to step 609), the LLDP aggregation module 550 creates a new port channel aggregation and adds the switch port to the new port channel aggregation.

When the network switch 180-1 is a secondary switch in an MLAG peer arrangement (step 608 to step 610), the LLDP aggregation module 550 queries the peer interface 212 to determine if the LLDP port channel aggregation list 553 maintained in the network switch 180-2 (i.e., the peer network switch) indicates a port channel aggregation created by the LLDP port aggregation of the network switch 180-2 and has the same system identifier as that decoded from the network management TLV (step 610 to step 611). If so (step 611 to step 612), the LLDP aggregation module 550 creates a port channel aggregation in the network switch 180-1, with the same port channel number as that in the network switch 180-2, and adds the switch port to that port channel aggregation (step 612). Otherwise (step 611 to step 613), the LLDP aggregation module 550 simply creates a new port channel aggregation in the network switch 180-1, adds the switch port to the new port channel aggregation, and assigns a port channel number to the switch port in the form "<sw-id><ifndex>", where sw-id is the switch identifier of the network switch 180-1 and "ifndex" is the switch port number, as previously described.

Continuing with FIG. 10, when the switch port is a member of a port channel aggregation in the network switch 180-1, the LLDP aggregation module 550 consults the LLDP port channel aggregation list 553 to determine if the switch port channel aggregation was created by the LLDP aggregation module 550 (FIG. 10, step 620).

When the switch port is a member of a port channel aggregation that was not created by the LLDP aggregation module 550, the method 600 continues to step 630 of FIG. 11 (step 620 to step 630; node B of FIG. 10 to node B of FIG. 11).

When the switch port is a member of a port channel aggregation that was created by the LLDP aggregation module 550 (step 620 to step 621), the LLDP aggregation module 550 checks the LLDP packet for the network management TLV (step 621). When the LLDP packet does not have the network management TLV, the LLDP aggregation module 550 stops the processing of the LLDP packet and removes the switch port from the port channel aggregation (step 622). A switch port that is a member of a port channel aggregation created by the LLDP aggregation module 550 should have the network management TLV. That is, a missing network management TLV at this point in the processing of the LLDP packet indicates that the network switch that sent the LLDP packet is no longer managed by the network manager 515 and, accordingly, the switch port should be removed from the port channel aggregation.

When the switch port is a member of a port channel aggregation that was created by the LLDP aggregation module 550 and has the network management TLV (step 621 to step 623), the LLDP aggregation module 550 determines the system identifier from the network management TLV (step 623). The LLDP aggregation module 550 then checks if the system identifier decoded from the network management TLV matches the system identifier for the port channel aggregation. If not (step 624 to step 625), the LLDP aggregation module 550 removes the switch port from the port channel aggregation (step 625). A mismatch between the system identifier indicated by the network management TLV and the system identifier for the port channel aggregation at this point in the LLDP packet processing indicates that the network switch that sent the LLDP packet has been moved to another network manager, another network device has been connected to the switch port, or some other configuration error has occurred, hence the removal of the switch port from the port channel aggregation.

When the network management TLV matches the system identifier for the port channel aggregation (step 624 to step 626), the LLDP aggregation module checks if the network manager identifier decoded from the network management TLV matches the identifier of the network manager 515 (step 624 to step 626). If not (step 626 to step 625), the LLDP aggregation module 550 removes the switch port from the port channel aggregation (step 625). A mismatch between the network manager identifier indicated by the network management TLV and the identifier of the network manager 515 indicates that the network switch that sent the LLDP packet has been moved to another network manager, another network device has been connected to the switch port, or some other configuration error has occurred, hence the removal of the switch port from the port channel aggregation.

The network manager identifier decoded from the network management TLV matching the identifier of the network manager 515 indicates a good condition (step 626 to step 627).

Continuing with FIG. 11, when the switch port is a member of a port channel aggregation that was not created by the LLDP aggregation module 550 (step 620 to step 630; node B of FIG. 10 to node B of FIG. 11), the LLDP aggregation module 550 checks the LLDP packet for the network management TLV (step 630). When the LLDP packet does not have the network management TLV, the port channel aggregation is deemed to be an LACP port channel aggregation that does not involve the LLDP aggregation module 550 (step 631) and, accordingly, the LLDP aggregation module 550 does not perform further processing of the LLDP packet.

When the switch port is a member of a port channel aggregation that was not created by the LLDP aggregation module 550 but the LLDP packet has the network management TLV (step 630 to step 632), the LLDP aggregation module 550 determines the system identifier from the network management TLV (step 632). The LLDP aggregation module 550 then checks if the system identifier decoded from the network management TLV matches the partner system identifier of the port channel aggregation (step 633). When the system identifier decoded from the network management TLV matches the partner system identifier of the port channel aggregation (step 633 to step 634), the LLDP aggregation module 550 adds the port channel aggregation to the LLDP port channel aggregation list 553 (step 634). Otherwise, when the system identifier decoded from the network management TLV does not match the partner system identifier of the port channel aggregation (step 633 to step 635), the LLDP aggregation module 550 deletes the port channel aggregation (step 635).

Systems and methods for automatically configuring multi-chassis link aggregations with link layer discovery in a computer network have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer network comprising:
a first network switch;
a second network switch; and
a third network switch having a first switch port that is linked to a first switch port of the first network switch over a first wired connection, the third network switch further having a second switch port that is linked to a first switch port of the second network switch over a second wired connection,
wherein the first network switch is adapted to receive a link layer discovery protocol (LLDP) packet over the first wired connection, scan the LLDP packet for a network management type-length-value (TLV), and add the first switch port of the first network switch to a port channel aggregation that includes the first switch port of the second network switch in response to finding the network management TLV in the LLDP packet.

2. The computer network of claim 1, further comprising:
a server computer having a first communication port and a second communication port,
wherein the first communication port of the server computer is linked to a second switch port of the first network switch by way of a third wired connection and the second communication port of the server computer is linked to a second switch port of the second network switch by way of a fourth wired connection.

3. The computer network of claim 2, wherein each of the first and second communication ports comprises a network interface card (NIC) port.

4. The computer network of claim 3, wherein each of the third and fourth wired connections comprises a backplane connection.

5. The computer network of claim 1, wherein the first wired connection comprises an Ethernet cable.

6. The computer network of claim 2, wherein the first network switch is adapted to extract the network management TLV from the LLDP packet, and decode the network management TLV to identify a system identifier associated with the port channel aggregation.

7. The computer network of claim 6, further comprising:
a network manager that is adapted to manage the first network switch and the second network switch,
wherein the first network switch is adapted to extract the network management TLV from the LLDP packet, and decode the network management TLV to identify an identifier of the network manager.

8. The computer network of claim 7, wherein the first network switch and the second network switch are configured as peer network devices, with the first network switch being a primary switch and the second network switch being a secondary switch.

9. A computer-implemented method of automatically configuring a multi-chassis link aggregation in network switches, the method comprising:

receiving a link layer discovery protocol (LLDP) packet at a first switch port of a first network switch, the first switch port of the first network switch being connected to a first switch port of a second network switch;
determining, from contents of the LLDP packet, that the second network switch and the first network switch are managed by a same network manager; and
in response to determining that the first and second network switches are managed by the same network manager, adding the first switch port of the first network switch to a port channel aggregation.

10. The computer-implemented method of claim 9, wherein determining that the second network switch and the first network switch are managed by the same network manager comprises:
identifying a network management type-length-value (TLV) in the LLDP packet.

11. The computer-implemented method of claim 10, further comprising:
decoding the network management TLV to identify a system identifier of the first network switch.

12. The computer-implemented method of claim 11, further comprising:
decoding the network management TLV to identify an identifier of the network manager that manages the first and second network switches.

13. A network switch comprising:
a first switch port;
a processor; and
a memory that is configured to store instructions that when executed by the processor cause the network switch to:
receive a link layer discovery protocol (LLDP) packet at the first switch port;
determine, from contents of the LLDP packet, that the network switch and another network switch that sent the LLDP packet to the network switch are managed by a same network manager; and
add the first switch port to a port channel aggregation in response to determining that the network switch and the other network switch that sent the LLDP packet to the network switch are managed by the same network manager.

14. The network switch of claim 13, wherein the instructions stored in the memory, when executed by the processor, further cause the network switch to:
extract a network management type-length-value (TLV) from the LLDP packet.

15. The network switch of claim 14, wherein the instructions stored in the memory, when executed by the processor, further cause the network switch to:
decode the network management TLV to identify a system identifier of the network switch.

16. The network switch of claim 15, wherein the instructions stored in the memory, when executed by the processor, further cause the network switch to:
decode the network management TLV to identify an identifier of the network manager.

* * * * *